June 25, 1935.	F. W. WHITEHEAD	2,006,123
MILLING MACHINE
Filed July 9, 1934   4 Sheets-Sheet 1

Inventor
Frederick W. Whitehead
by Wilkinson & Mawhinney
Attorneys.

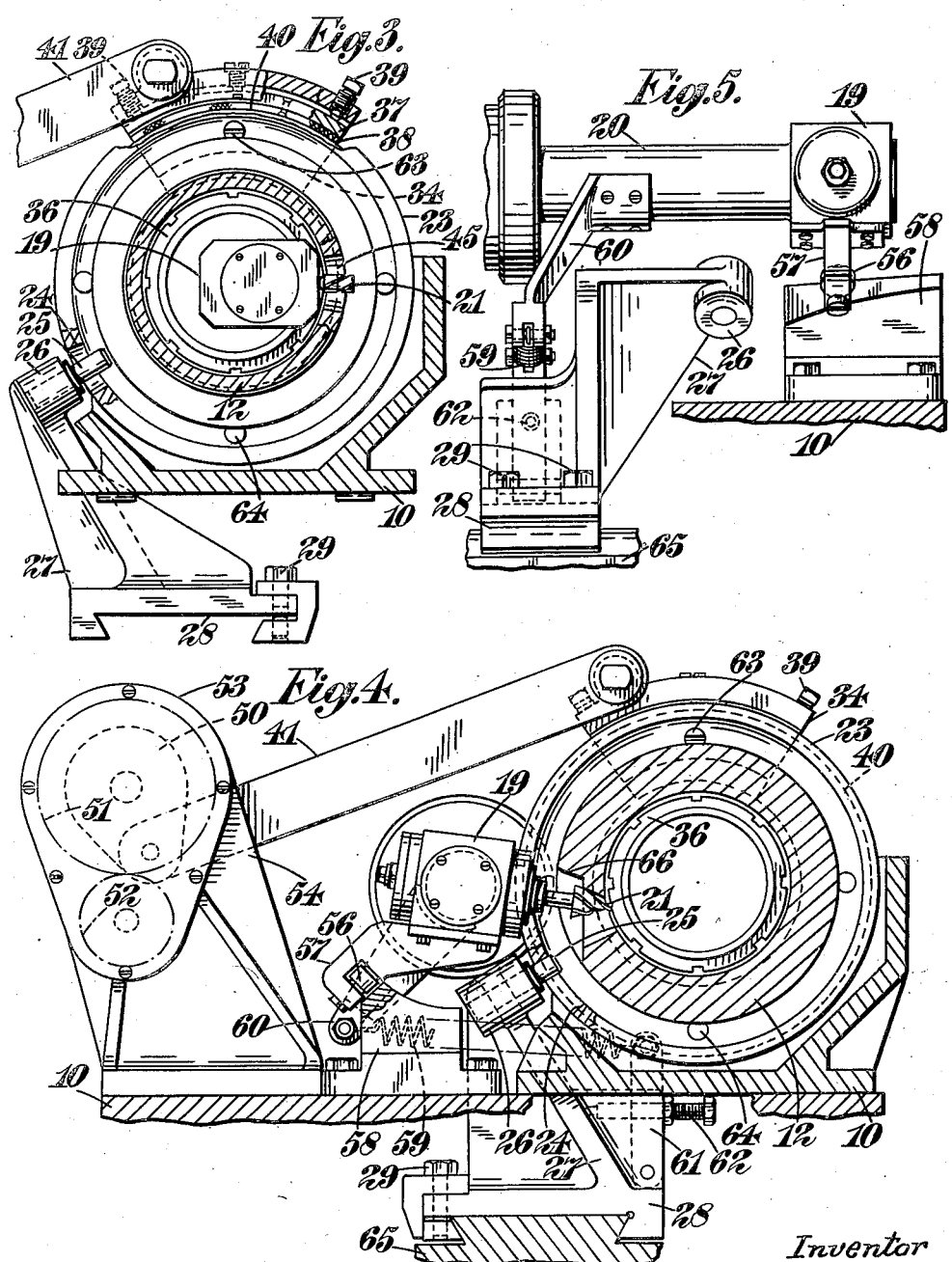

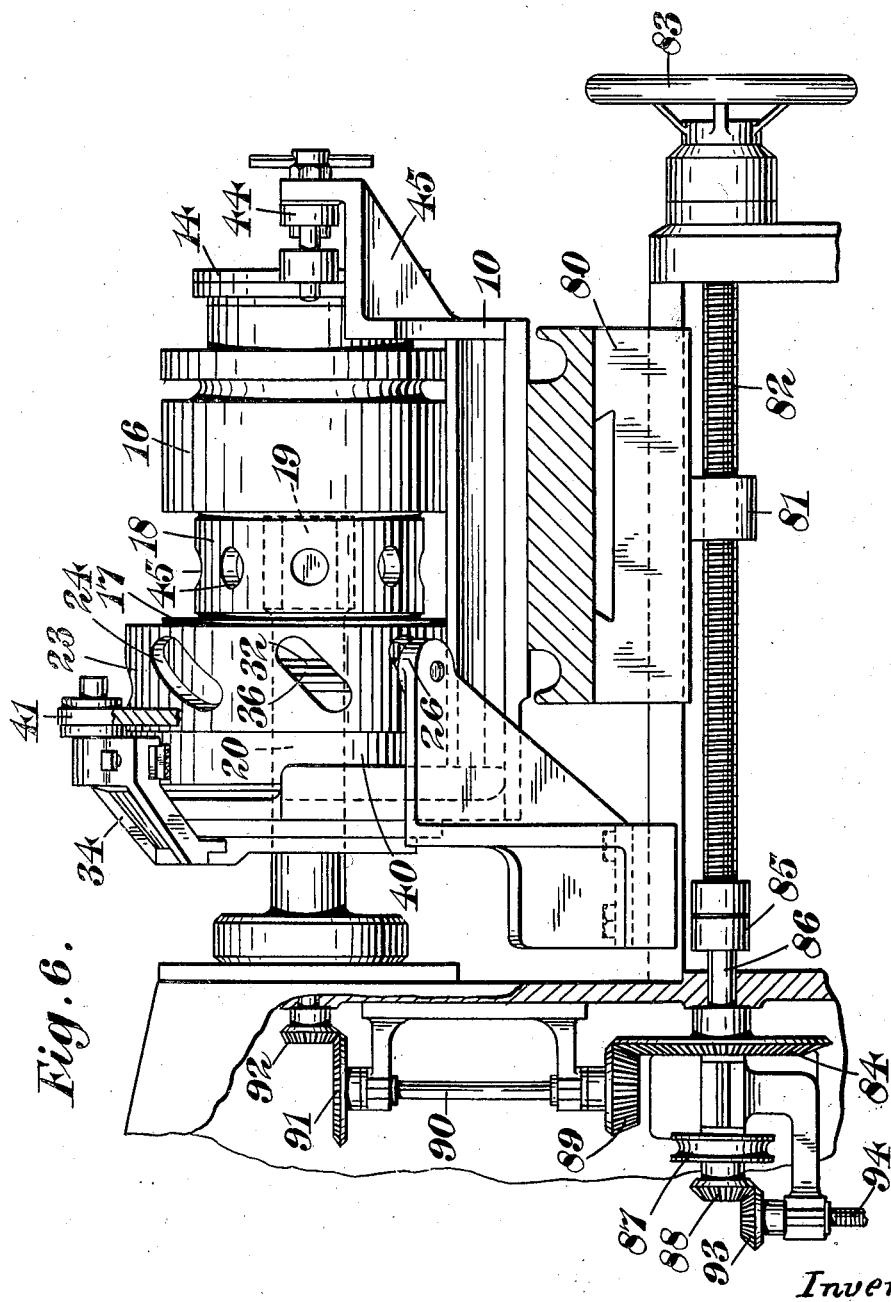

June 25, 1935.  F. W. WHITEHEAD  2,006,123
MILLING MACHINE
Filed July 9, 1934   4 Sheets-Sheet 4

Inventor
Frederick W. Whitehead
by Wilkinson & Mawhinney
Attorneys.

Patented June 25, 1935

2,006,123

UNITED STATES PATENT OFFICE 2,006,123

MILLING MACHINE

Frederick William Whitehead, Bristol, England, assignor to The Bristol Aeroplane Company Limited, Bristol, England, a British company Application July 9, 1934, Serial No. 734,362
In Great Britain April 19, 1934

5 Claims. (Cl. 90—13.4)

This invention is for improvements in or relating to milling, drilling and like shaping machines of the kind incorporating copying mechanism whereby the work is cut into the desired shape in accordance with a correspondingly-shaped former or pattern. Such machines are particularly suitable for cutting complex and irregular shapes, such as cam profiles, and a particular application of a milling machine according to this invention is to the operation of cutting the ports in the cylinder-barrels and sleeves of sleeve-valve internal-combustion engines, though there are other purposes to which the invention may be applied.

It is the object of the present invention to simplify the cutting of complex and irregular shapes. According to the present invention in a copying milling machine of the kind described, a slipping coupling is incorporated in the drive whereby the former or pattern can limit the amplitude of the cutting movement, irrespective of the amplitude of the driving movement.

According to another feature of the present invention, in or for a milling machine of the kind set forth, driving mechanism for reciprocating or oscillating the work-carrier with respect to a cutter incorporates a friction coupling whereof the driving element is reciprocated or oscillated through a constant large amplitude and whereof the driven element drives both the work-carrier with respect to the cutter and a former or pattern with respect to an abutment, which abutment thus controls the amplitude of the relative movement between the work and the cutter in accordance with the shape of the former, and irrespective of the amplitude of movement of the driving element of the friction coupling.

By the expression "large amplitude" is meant an amplitude at least as great as the greatest amplitude which is required in the relative movement between the work and the cutter. Thus, if the cutter remains stationary and the work is driven, the work and the former will move with respect to the cutter until the movement is arrested by the abutment; the friction coupling will then permit slip between the two elements while the driving element completes its stroke. At the commencement of the return stroke of the driving element, movement will again be imparted to the work and to the former.

It will be understood that, in addition to the oscillating or reciprocating movement between the work and the cutter above described, there is also a slow continuous relative movement in another direction, for example a direction parallel to the axis of oscillation. This additional movement may be effected by means of screw-feed mechanism in known manner. According to another feature of the invention means (e. g. a cam and follower) are provided for automatically controlling the angle between the cutter and the work in accordance with the movement due to the screw-feed mechanism. This feature is of particular importance where the invention is applied to the operation of cutting the ports in sleeve-valve cylinder-barrels, since it enables the correct angle between the wall of a port and the radius of the cylinder to be automatically obtained, as will be more fully explained hereinafter. Other features of the invention will appear hereinafter.

A specific embodiment of the present invention will now be described by way of example with reference to the accompanying drawings, of which—

Figure 3 is a sectional elevation on the line 3—3 of Figure 2;

Figure 4 is an elevation, partly in section showing another arrangement of the machine, whilst Figure 5 is a view of the cutter-head and the cam for controlling the angle of the cutter with respect to the work.

Figure 6 shows a side view of the machine and operating mechanism.

Figure 7 shows a plan view of the mechanism of Figure 6.

Like reference numerals denote like parts throughout the several figures of the drawings.

Figure 1:
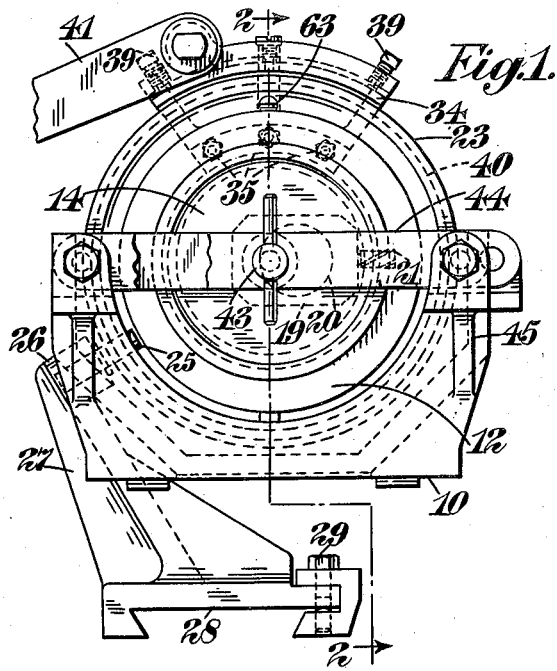
Figures 1 and 2 are an end elevation and a side elevation, respectively, of a machine for milling the ports in the wall of a cylinder-barrel for a sleeve-valve internal-combustion engine, Figure 2 being a section on the line 2—2 of Figure 1.

As shown first in Figures 1, 2 and 3, the machine comprises a work-carrying frame 10, slidable longitudinally in a manner hereinafter explained, and a rotatable work-carrying head 11 on which the cylinder barrel 12 is located by means of pins 13. The head 11 is formed with a rim 40 by which the head is supported on a ball-bearing 22 surrounding a fixed bush 31. The other end of the cylinder-barrel 12 is supported by an end plate 14 in two parts separated by a bearing 15. The plate 14 is held against the cylinder-barrel by a screw 43 which is threaded in a cross-bar 44 bolted to brackets 45 formed integrally with the frame 10.

The cylinder-barrel 12 is of the type intended for use in an air-cooled radial-cylinder sleeve-valve aircraft engine, and the portions 16 and 17 are intended to be cut into cooling fins. The region 18 lying between the cooling fins is required to be cut with ports of such shape and disposition as to co-operate with similarly formed ports in a sleeve which reciprocates and rotates between the cylinder-barrel and the piston inside it. With a machine according to the present invention the ports in the cylinder barrel are cut first from the inside of the barrel and then from the outside. Figures 1, 2 and 3 show the machine arranged for cutting the ports from inside the barrel. A cutter-head 19 carried on an arm 20 passes along inside the cylinder-barrel and a central shaft inside the arm 20 drives, through bevel gearing of known construction, a cutter 21 (see Figure 3) which protrudes from the cutter-head 19 at right-angles to the arm 20.

The rotatable head 11 has attached to it by screws 63 and locating pins 64, a former ring 23 formed with holes 24 of a shape corresponding to the shape of the ports which are required to be cut in the cylinder-barrel 12. The screws 63 abut against the outer race of the bearing 22 and the reaction to this force is afforded by an annular plate 68 secured to the rim 40. Co-operating with the former ring 23 is a former pin 25 carried in a boss 26 on the end of a bracket 27. The bracket 27 is fixed during the working of the machine but is provided with a slide 28 whereby its position may be adjusted and maintained by means of a bolt 29; the slide 28 is supported by a suitable guide 65 (Figure 4).

Figure 2:
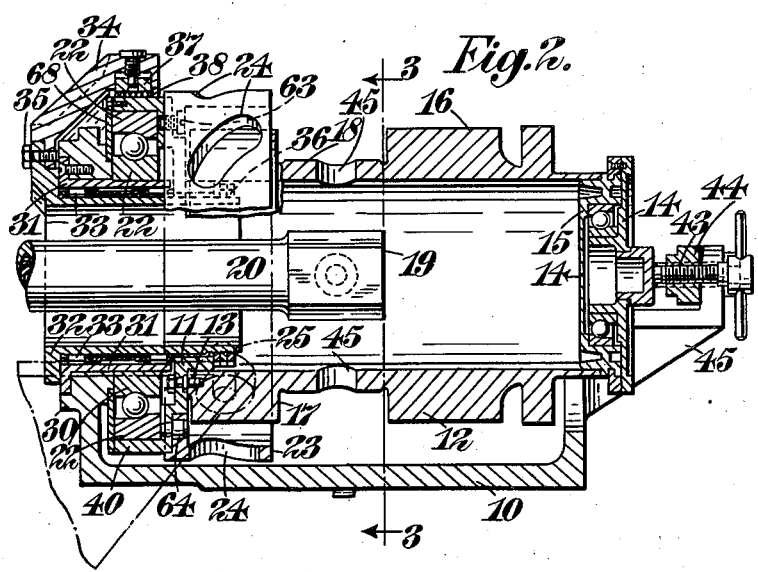
Figure 1:
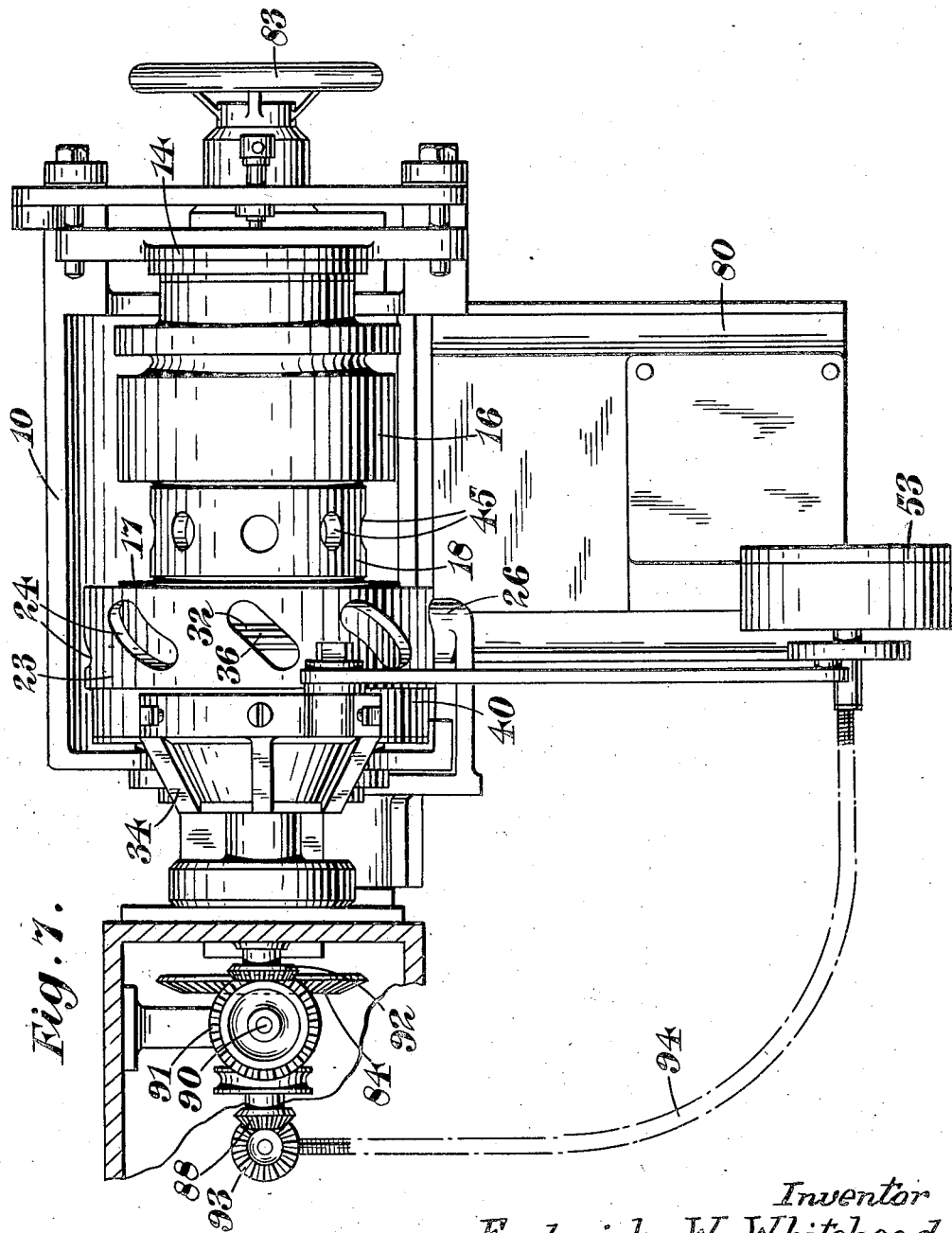

As shown at the left-hand end of Figure 2, the frame 10 is formed with a boss 30 which receives within it the bush 31 which supports the ball bearing 22. It also carries within it a sleeve 32 separated from it by a roller-bearing 33. The sleeve 32 has a flange at its outer end to which a sector-shaped bracket 34 is attached by means of bolts 35. The inner end of the sleeve 32 is engaged by a screwed ring 36.

The bracket 34 has an internal groove which accommodates an arcuate metal strip 37 to the inner surface of which is affixed a strip 38 of friction material. The strip 37 is guided in the bracket 34 by means of suitable pins and it can be screwed inwardly by means of adjusting screws 39 for the friction strip 38 to engage the rim 40 which, as described above, is attached to the rotatable head 11. The bracket 34 and the rim 40 thus constitute the two elements of a friction coupling.

As shown in Figures 1 and 3, the bracket 34 has an upstanding boss to which is pivoted a connecting rod 41 which, in a manner hereinafter described with reference to Figure 4, is reciprocated by means of a crank so that the bracket 34 is oscillated to and fro about the centre of rotation of the cylinder-barrel 16.

In operating the machine, the cylinder-barrel 12 is first placed in position, as shown in Figure 2. Prior to the milling operation, a hole (such as is shown at 45) is bored in the wall of the cylinder-barrel in a position lying within the boundary of one of the ports to be cut. The purpose of this hole is to enable the cutter 21 to be inserted in position, as shown in Figure 3.

If the machine is now started, the frame 10 of the work-carrier proceeds to move continuously in a right- or left-hand direction, as shown in Figure 2, under the control of screw-feed mechanism (not shown) of suitable construction. In addition, the bracket 34 is oscillated by means of the reciprocating link 41. As may be seen from Figure 3, the amplitude of oscillation of the rotatable head 11 is limited by the circumferential extent of the hole 24 which is engaged by the fixed former-pin 25; on the other hand, the amplitude of movement of the bracket 34 is constant and is determined by the amplitude of movement of the connecting rod 41. Thus, the movement of the rotatable head 11 will continue until the wall of the hole in the former ring 23 is engaged by the pin 25. The movement of the rotatable head 11 is then arrested and the bracket 34 continues its stroke, the friction surface 38 slipping on the rim 40. On the commencement of the return stroke of the bracket 34, a return motion is imparted to the rotatable head 11 which continues until the pin 25 abuts (by rotation of the former ring) against the other side of the hole 24 with which it is in engagement.

During the oscillating movement permitted by the engagement of the pin 25 with the appropriate hole 24, the cylinder-barrel, it will be understood, is also rotating with respect to the cutter 21 with the result that the cutter will enlarge the hole 45 in a circumferential direction to an extent determined by the permitted amplitude of oscillation of the cylinder-barrel. It will thus be seen that the circumferential dimension of the enlarged hole 45 will depend at any time on the corresponding circumferential dimension of the appropriate hole 24. The holes 24 are formed to correspond in shape with the ports which are to be cut in the cylinder-barrel, whereby the required shape of these ports is obtained, although, it will be understood, the holes 24 are not normally of the same size and shape as the ports to be cut, the exact shape depending upon the relation between the diameter of the cutter and the diameter of the former pin 25. Longitudinal movement of the frame 10 of the work-carrier permits the abutment pin 25 to explore the entire hole 24 until the pin 25 reaches the end of the hole 24 in an axial direction. Automatic mechanism of known construction, or manually-controlled means, then comes into operation to suspend longitudinal movement of the work-carrier; the longitudinal movement may then be reversed so that the other end of the hole 24, in an axial direction, is also explored. Alternatively, the hole 45 may be bored at one axial extremity of the port so that only one traversing movement of the work-carrier is necessary.

The friction strip 38 must grip the rim 40 with such force as to give the required pressure to the cutter 21 but such as to slip when the wall of the hole 24 is engaged by the pin 25. The pressure of the friction strip 28 on the rim 40 may be adjusted by means of the screws 39.

For cutting externally, the arrangement shown in Figure 4 is used. The work-carrier 10 is arranged on one side so that the cutter-head 19 is outside the cylinder-barrel. Figure 4 also shows the connecting-rod 41 connected to a crank 50 which is driven through gearing 51 and 52. The gear 52 is driven from the machine-shaft through telescopic shafting and universal joints to permit of the movement of the work-carrying frame. The gearing 51 and 52 and the crank 50 are suitably enclosed in a housing 53 carried on a bracket 54 on the machine-frame 10. This form of drive for oscillating the bracket 34 is also used in the arrangement of the machine already described with reference to Figures 1, 2 and 3.

In sleeve-valve internal-combustion-engines the required shape of the ports in transverse section (as shown in Figure 4) varies in accordance with certain requirements. For example, in order to obtain a sharp cut-off in the closing of the valve, the wall of the port is inclined obliquely to the cylinder radius on which its inner edge lies. Such obliquity may be obtained by means of a suitably-shaped milling cutter, but in order to vary the degree of obliquity in accordance with the longitudinal position of the cylinder-barrel, a roller 56, carried on a bracket 57 which is bolted to the cutter-head 19, bears against a suitably-shaped cam-surface 58. The shape of the cam may be more clearly seen from Figure 5. The cutter-head 19 is pressed in a direction to retain the roller 56 in contact with the cam 58 by means of a tension spring 59 connected between a bracket 60 on the cutter-head and a link 61 pivoted to the frame 27 which supports the abutment pin 25. The position of the link 61 may be adjusted by means of a screw 62 whereby the tension in the spring 59 may be varied as required.

The disposition of the roller 56, the cam 58 and the bracket 60 may be seen more clearly from Figure 5, and it will be understood that the exact shape of the cam-surface 58 depends entirely on the particular shape, in transverse section, which it is required to give to the wall of the port which is being cut. In the example illustrated with reference to Figures 4 and 5, as the cylinder-barrel is moved to the right (Figure 5) the roller 56 will fall and the cutter-head will rotate in a counter-clockwise direction, as shown in Figure 4. The arm 20 of the cutter-head is suitably carried at its rear end in a bearing (not shown) which will accommodate the necessary tilting movements above described.

The port-forming operation is completed by cutting the outer part of the port to larger dimensions, as shown in Figure 4. This enlarged portion 66, in the assembled engine, receives an induction belt or exhaust belt through which gases enter or leave the cylinder.

As shown in Figures 6 and 7, the frame 10 of the machine is carried on a movable carriage 80 having a depending lug 81 for engagement by a feed-screw 82. The feed-screw 82 may be manually controlled by a hand-wheel 83, but is normally rotated automatically at a constant speed by means of a shaft 86 which transmits a drive through a dog or other clutch 85. The shaft 86 is driven by a belt-pulley 87 and carries two bevel-wheels 84 and 88. The wheel 84 engages a gear 89 on a vertical shaft 90 which drives, through gearing 91 and 92, the shaft for rotating the milling tool 21. The gear 88 engages a gear 93 carried on a flexible shaft 94 which transmits a drive to the mechanism 53 for oscillating the cylinder barrel, as described with reference to Figures 1 to 5.

It will be seen that the present invention provides a simplified mechanical means for milling complex or irregular shapes. The amplitude of movement of the work-carrying head is independent of the amplitude of movement of the reciprocating rod 41 and is determined solely by the shape of the hole in the former. It will be understood that, instead of moving the work and holding the tool or cutter stationary, this arrangement may be inverted; that is to say, the cutter may travel and oscillate with respect to the work and in this alternative arrangement the cutter-head carries the former ring and the amplitude of movement is controlled in the same way as the movement of the cylinder-barrel is controlled in the example of the invention herein described.

It will also be understood that the invention is not limited in its application to the particular operation of cutting the ports in barrels of sleeve-valve cylinders; it may also be applied to the operation of cutting the ports in the sleeves for sleeve-valve engines, cutting cam-profiles or cutting complex or irregular shapes in general.

Where the invention is applied to the operation of cutting shapes which lie in a plane instead of on a cylindrical surface, as in the example herein described, the relative movement between the cutter and the work will be one of reciprocation and not oscillation. The former in this case will be a plate instead of a ring, and the friction coupling will comprise a plane friction surface instead of a curved surface.

Finally, it will also be understood that although the form of coupling herein described is preferred, it is also within the invention to use a coupling similar to the known type of friction clutch comprising discs which interengage along a plane annular surface.

I claim:—

1. A milling machine of the kind set forth comprising, in combination, driving mechanism for reciprocating or oscillating the work-carrier with respect to the cutter, a friction-coupling whereof the driving element is reciprocated or oscillated by the said driving mechanism through a constant large amplitude and whereof the driven element drives both the work-carrier with respect to the cutter, and a former or pattern with respect to an abutment, which abutment thus controls the amplitude of the relative movement between the work and the cutter in accordance with the shape of the former, and irrespective of the amplitude of movement of the driving element of the friction coupling.

2. A copying milling machine of the kind set forth comprising in combination, driving mechanism for oscillating the work-carrier with respect to a cutter and a friction coupling whereof the driving element is oscillated by the said driving mechanism through a constant large amplitude and whereof the driven element oscillates both the work-carrier with respect to the cutter and a cylindrical former with respect to an abutment.

3. A copying milling machine according to claim 2, wherein the former is oscillable about the same axis as the work-carrier and carries a cylindrical rim, constituting the said driven element of the friction coupling, and engaged by a strip of friction material carried by an oscillating bracket, constituting the said driven element.

4. A copying milling machine comprising, in combination, driving mechanism for oscillating the work-carrier with respect to a cutter, means for continuously advancing the work-carrier with respect to the cutter along the axis of said oscillation and cam mechanism interconnecting the work carrier and the cutter, whereby the angle between the cutter and the work is automatically varied during the advancing movement of the work carrier.

5. A copying milling machine of the kind described comprising, in combination, driving mechanism for oscillating the work-carrier with respect to a cutter, a friction coupling whereof the driving element is oscillated by the said driving mechanism through a constant large angle and whereof the driven element oscillates both the work-carrier with respect to the cutter and a cylindrical former with respect to an abutment, means for continuously advancing the work-carrier with respect to the cutter in a direction parallel to the axis of said oscillation, and cam-mechanism for automatically varying the angle between the cutter and the work.

FREDERICK WILLIAM WHITEHEAD.